(12) United States Patent
Zhang et al.

(10) Patent No.: US 12,412,279 B2
(45) Date of Patent: Sep. 9, 2025

(54) PLANAR CONTOUR RECOGNITION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Shenghao Zhang, Shenzhen (CN); Yonggen Ling, Shenzhen (CN); Wanchao Chi, Shenzhen (CN); Yu Zheng, Shenzhen (CN); Xinyang Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 390 days.

(21) Appl. No.: 17/956,364

(22) Filed: Sep. 29, 2022

(65) Prior Publication Data

US 2023/0015214 A1 Jan. 19, 2023

Related U.S. Application Data

(63) Continuation of application No. PCT/CN2021/114064, filed on Aug. 23, 2021.

(30) Foreign Application Priority Data

Sep. 1, 2020 (CN) .......................... 202010901647.7

(51) Int. Cl.
*G06T 7/149* (2017.01)
*G06T 7/13* (2017.01)
(Continued)

(52) U.S. Cl.
CPC ................ *G06T 7/149* (2017.01); *G06T 7/13* (2017.01); *G06T 7/246* (2017.01); *G06T 7/75* (2017.01)

(58) Field of Classification Search
CPC ........... G06T 7/149; G06T 7/246; G06T 7/75; G06T 7/13
See application file for complete search history.

(56) References Cited

U.S. PATENT DOCUMENTS 9,102,055 B1 * 8/2015 Konolige ............... B25J 9/1612
9,607,207 B1 * 3/2017 Puri ....................... G06V 20/64
(Continued)

FOREIGN PATENT DOCUMENTS

CN 101493889 A 7/2009
CN 102006398 A 4/2011
(Continued)

OTHER PUBLICATIONS

M. Tomono, "Image-based planar reconstruction for dense robotic mapping," 2012 IEEE International Conference on Robotics and Automation, Saint Paul, MN, USA, 2012, pp. 3005-3012, doi: 10.1109/ICRA.2012.6225184. (Year: 2012).*

(Continued)

*Primary Examiner* — Matthew C Bella
*Assistant Examiner* — Jinsu Hwang
(74) *Attorney, Agent, or Firm* — ANOVA LAW GROUP PLLC

(57) ABSTRACT

This application relates to a planar contour recognition method and apparatus, a computer device, and a storage medium. The method includes obtaining a target frame image collected from a target environment; fitting edge points of an object plane in the target frame image and edge points of a corresponding object plane in a previous frame image to obtain a fitting graph, the previous frame image being collected from the target environment before the target frame image; deleting edge points that do not appear on the object plane of the previous frame image, in the fitting (Continued)

graph; and recognizing a contour constructed by remaining edge points in the fitting graph as a planar contour.

19 Claims, 9 Drawing Sheets

(51) Int. Cl.
  *G06T 7/246* (2017.01)
  *G06T 7/73* (2017.01)

(56) References Cited

U.S. PATENT DOCUMENTS

| | | | |
|---|---|---|---|
| 9,996,974 B2 * | 6/2018 | Reisner-Kollmann | ................... G06T 19/006 |
| 2019/0333242 A1 | 10/2019 | Chen et al. | |

FOREIGN PATENT DOCUMENTS

| | | |
|---|---|---|
| CN | 109255801 A | 1/2019 |
| CN | 110081862 A | 8/2019 |
| CN | 110490916 A | 11/2019 |
| CN | 112102342 A | 12/2020 |

OTHER PUBLICATIONS

The European Patent Office (EPO) The Extended European Search Report for 21863535.Oct. 2, 2023 9 Pages.
Masahiro Tomono:"Image-based planar reconstruction for dense robotic mapping", Robotics and Automation (ICRA), 2012 IEEE, May 14, 2012, pp. 3005-3012.
The World Intellectual Property Organization (WIPO) International Search Report for PCT/CN2021/114064 Nov. 23, 2021 6 Pages (including translation).
Toru Nakashika et al. "3D-Object Recognition Based on LLC Using Depth Spatial Pyramid", p. 4224-4228, 2014, 22nd International Conference on Pattern Recognition.
Kaiming He et al. "Mask R-CNN", 2017, p. 2961-2969, Proceedings of the IEEE international conference on computer ision.
Carbonara S et al. "Efficient Stairs Detection Algorithm Assisted Navigation for Vision Impaired People", 2014, p. 313-318, IEEE International Symposium on Innovations in Intelligent Systems and Applications (INISTA) Proceedings.
Edwin Olson, "AprilTag: A robust and flexible visual fiducial system", 2011, p. 3400-3407, 2011 IEEE International Conference on Robotics and Automation.

* cited by examiner

PLANAR CONTOUR RECOGNITION METHOD AND APPARATUS, COMPUTER DEVICE, AND STORAGE MEDIUM

RELATED APPLICATIONS

This application is a continuation application of PCT Application PCT/CN2021/114064, filed on Aug. 23, 2021, which in turn claims priority to Chinese Patent Application No. 2020109016477, entitled "PLANAR CONTOUR RECOGNITION METHOD AND APPARATUS, COMPUTER DEVICE, AND STORAGE MEDIUM" and filed with the China National Intellectual Property Administration on Sep. 1, 2020. The two applications are both incorporated herein by reference in their entirety.

FIELD OF THE TECHNOLOGY

This application relates to the field of computer technologies, and in particular, to a planar contour recognition method and apparatus, a computer device, and a storage medium.

BACKGROUND OF THE DISCLOSURE

With the continuous development of the mechanical technology, more and more intelligent devices are put into corresponding fields for application. These intelligent devices need to effectively recognize spatial positions and sizes of target objects in target environments before making corresponding operations. For example, in a sorting scenario of the package delivery field, an intelligent robot needs to recognize a spatial position and a size of an item before accurately clamping the item for sorting.

A planar contour of a target object is usually recognized by using a deep-learning-based method, so that a specific spatial position and size of the target object is determined by using the recognized planar contour. However, if the planar contour of the target object is recognized by using the deep-learning-based method, recognition accuracy thereof usually relies much on pre-training, and the training is time-consuming, thereby affecting efficiency of recognizing the planar contour of the target object.

SUMMARY

According to various embodiments provided in this application, a planar contour recognition method and an apparatus, a computer device, and a storage medium are provided.

One aspect of the present disclosure provides a planar contour recognition method performed by a computer device. The method includes obtaining a target frame image collected from a target environment; fitting edge points of an object plane in the target frame image and edge points of a corresponding object plane in a previous frame image to obtain a fitting graph, the previous frame image being collected from the target environment before the target frame image; deleting edge points that do not appear on the object plane of the previous frame image, in the fitting graph; and recognizing a contour constructed by remaining edge points in the fitting graph as a planar contour.

Another aspect of the present disclosure provides a computer device, including a memory and a processor, the memory storing a computer program, the processor, when executing the computer program, implementing the implementing the above described methods of planar contour recognition.

Another aspect of the present disclosure provides a non-transitory computer-readable storage medium, storing a computer program, when executed by a processor, implementing the above described methods of planar contour recognition.

Details of one or more embodiments of this application are provided in the subsequent accompanying drawings and descriptions. Other features and advantages of this application become clearer from the specification, the accompanying drawings, and the claims.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

Figure 1:
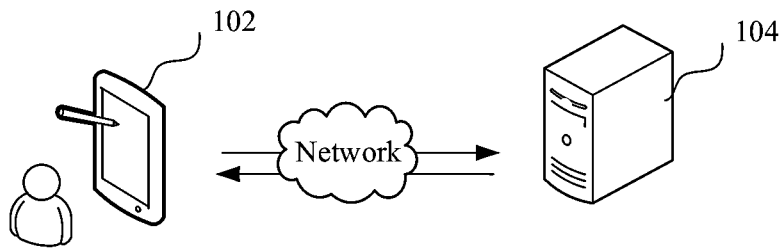
FIG. 1 is a diagram of an application environment of a planar contour recognition method according to an embodiment.

A planar contour recognition method provided in this application may be applied to an application environment shown in FIG. 1. The application environment includes a terminal 102 and a server 104. The terminal 102 collects a target frame image from a target environment, and displays the collected target frame image; the terminal 102 fits edge points of each object plane in the target frame image and edge points of a corresponding object plane in a previous frame image to obtain a fitting graph, and superimposes the fitting graph on the object plane for display; in the fitting graph, edge points that do not appear on the object plane of the previous frame image are deleted, the previous frame image being collected from the target environment before the target frame image; and a planar contour constructed by remaining edge points in the fitting graph is displayed on the object plane of the target frame image.

In addition, a fitting progress of the fitting graph may include: sending, by the terminal 102, the target frame image and the previous frame image to the server 104; and fitting, by the server 104, the edge points of each object plane in the target frame image to obtain the fitting graph, and sending the fitting graph to the terminal 102, so that the fitting graph is superimposed on the object plane for display.

The terminal 102 may be a smartphone, a tablet computer, a notebook computer, a desktop computer, a smart speaker, a smartwatch, or the like, but this application is not limited thereto.

The server 104 may be an independent physical server, or may be a server cluster constituted by a plurality of physical servers, or may be a cloud server providing basic cloud computing services, such as a cloud server, a cloud database, cloud storage and a CDN.

The terminal 102 and the server 104 may be connected in a communication connection mode such as Bluetooth, a universal serial bus (USB), or a network, which is not limited in this application.

Figure 2:
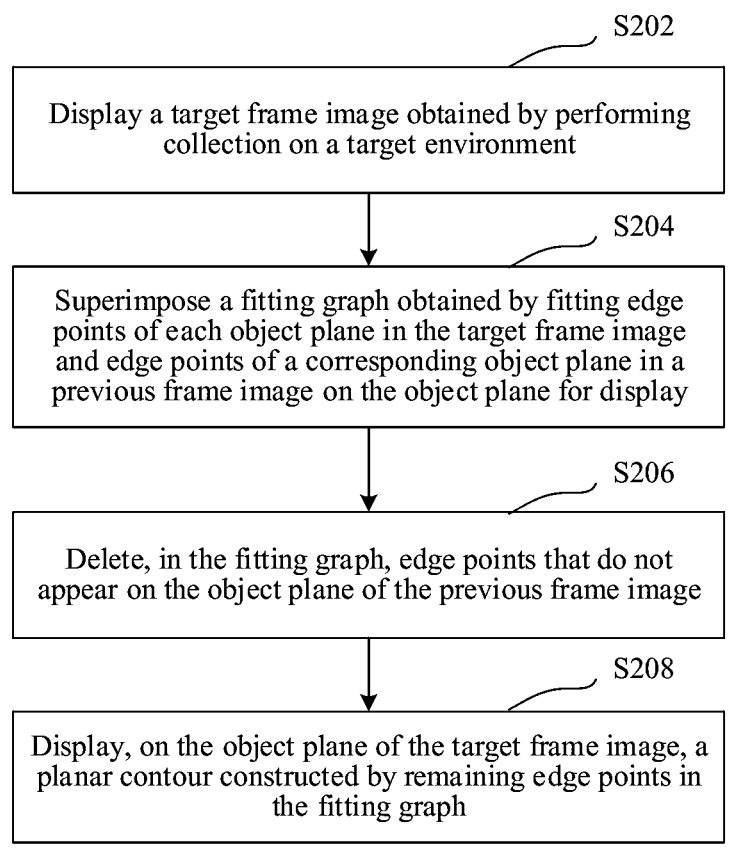
FIG. 2 is a schematic flowchart of a planar contour recognition method according to an embodiment.

In an embodiment, as shown in FIG. 2, a planar contour recognition method is provided, which may be performed by the terminal 102, or may be performed by the terminal 102 and the server 104 in cooperation. Descriptions are made by using an example in which the method is performed by the terminal 102 in FIG. 1, and the method includes the following steps:

S202. Display a target frame image collected from a target environment.

The target environment may be a working environment of the terminal. The target environment is, for example, an environment in which a robot sorts items in the express delivery field, or a road environment in which the robot walks during working.

Figure 3:
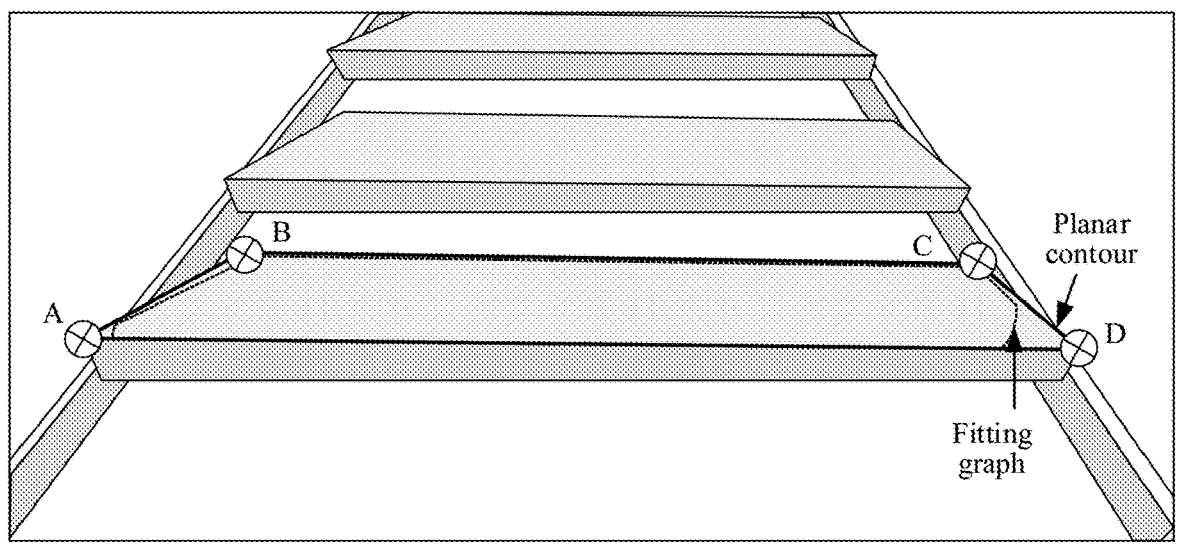
FIG. 3 is a schematic diagram of displaying a fitting graph and a planar contour on a target frame image according to an embodiment.

The target frame image may refer to an image obtained by the terminal by collecting an image or a video in the target environment through a built-in camera, or an image obtained by collecting an image or a video in the target environment through an independent camera. The target frame image may be a three-dimensional image carrying depth information, such as a depth image. In some embodiments, as shown in FIG. 3, the target frame image may be an image of a staircase in the target environment.

In an embodiment, if the built-in camera of the terminal collects from the target environment in real time to obtain a video, the video is decoded to obtain target frame images, and then the target frame images obtained by decoding are displayed. Alternatively, if the independent camera collects from the target environment in real time to obtain a video, the video is sent to the terminal in real time and decoded by the terminal to obtain target frame images, and then the target frame images obtained by decoding are displayed. The target frame images are video frames in the video.

In another embodiment, if the built-in camera of the terminal shoots the target environment at a preset time interval to obtain a target frame image, the shot target frame image is displayed on a display screen. Alternatively, if the independent camera shoots the target environment at the preset time interval to obtain a target frame image, the shot target frame image is sent to the terminal, and the terminal displays the received target frame image.

S204. Superimpose a fitting graph obtained by fitting edge points of each object plane in the target frame image and edge points of a corresponding object plane in a previous frame image on the object plane for display.

The object plane may refer to a surface of an object displayed in the target frame image, that is, a surface of an unblocked object. The object plane may appear in the target frame image, or appear in the previous frame image. In addition, the object plane may be a horizontal plane or a curved plane. In subsequent embodiments, descriptions are made by using an example in which the object plane is a horizontal object plane.

The object may refer to a target object that is in the target environment and shot in the target frame image. Surfaces of the object in various directions may be horizontal planes. In addition, the object may be in a specific geometric shape. For example, the object may be an express box for containing an express item, or a staircase, or the like.

The fitting graph may refer to a closed curve diagram obtained by fitting edge points by using a curve line, or a closed graph obtained by fitting the edge points by using a straight line. As shown in FIG. 3, a dashed graph is a fitting graph obtained by fitting edge points of a plane of a step of the staircase.

If the target frame image is a three-dimensional image, corresponding edge points may alternatively be voxels of the object plane in the target frame image, or three-dimensional edge points of the target object in the target environment (that is, a real scenario). If the target frame image is a two-dimensional image, corresponding edge points may alternatively be two-dimensional pixels, or two-dimensional edge points of the target object in the target environment.

In an embodiment, a fitting degree of the edge points of the object plane may be determined based on the fitting graph displayed by superimposing. If the fitting degree meets a preset fitting condition, the fitting graph may be directly used as the planar contour of the object plane. If the fitting degree does not meet the preset fitting condition, S206 may be performed. The preset fitting condition may refer to whether a shape of the fitting graph of the object plane is a target shape. For example, for a rectangular object, whether the fitting graph is in a rectangular shape; or under a side-view angle, whether the fitting graph is in a rhombus shape.

In an embodiment, the fitting graph is obtained by performing edge point fitting operations to fit the edge points of each object plane in the target frame image and the edge points of the corresponding object plane in the previous frame image. The edge point fitting steps include: determining, by the terminal, a spatial position corresponding to each point in the target frame image according to the depth information; determining a plane on which each point is located based on the spatial position and a plane equation to obtain the object plane; and fitting the edge points of the object plane and the edge points of the object plane corresponding to the previous frame image to obtain the fitting graph. The terminal superimposes the obtained fitting graph on the object plane of the target frame image for display.

The spatial position may be a spatial coordinate in a three-dimensional spatial coordinate system.

In an embodiment, the target frame image includes a graphic code carrying direction information. The steps of determining the spatial position corresponding to each point in the target frame image according to the depth information may specifically include: determining, by the terminal, a coordinate system reference direction according to the direction information carried by the graphic code; constructing a spatial coordinate system based on the coordinate system reference direction; and determining, in the spatial coordinate system, the spatial position corresponding to each point in the target frame image based on the depth information.

The graphic code may be a barcode or a two-dimensional code, such as an Apriltag for indicating a direction.

In an embodiment, the terminal may calculate, according to the depth information, a distance between each point of an object in the target frame image and the camera, and distances between points of the object. According to the distances, the spatial position of each point of the object in the target frame image in the spatial coordinate system may be determined.

In an embodiment, the steps of determining the plane on which each point on the surface of the object is located may specifically include: inputting, by the terminal, the spatial position (that is, the spatial coordinate) and the plane equation to a planar fitting model; and fitting, by using the planar fitting model, the spatial position of each point of the object according to the plane equation, to obtain the plane on which each point is located, thereby obtaining the object plane of the plane.

In an embodiment, the terminal fits the edge points of the object plane by using a straight line or a curve line to obtain a closed curve diagram, or a closed graph formed by straight line segments. The closed curve diagram or the closed graph is determined as the fitting graph of the edge points of the object plane.

In an embodiment, the steps of fitting the edge points of the object plane and the edge points of the object plane corresponding to the previous frame image to obtain the fitting graph may specifically include: determining, by the terminal, a previous target frame image that includes the object plane in each of the previous frame images if the object plane is a partial region plane of the object or blocked by another object in the target frame image; extracting edge points from an object plane of the previous target frame image; selecting target edge points from the edge points that are extracted from the object plane in the previous target frame image and the edge points of the object plane in the target frame image; and fitting the selected target edge points to obtain the fitting graph. Then, the terminal superimposes the obtained fitting graph on the object plane of the target frame image for display.

The edge points are three-dimensional edge points. The previous frame image is a frame image obtained before the target frame image by collecting from the target environment, for example, the previous frame image is a previous frame of image of the target frame image, or previous n frames (that is, a previous frame of image to a previous nth frame of image) of images collected before the target frame image. Correspondingly, the previous target frame image refers to an image of the object plane including the object in the previous frame image.

A process of selecting the target edge points may include: first, superimposing the previous target frame image on the target frame image, so that the edge points of the object plane in the target frame image and the edge points of the corresponding object plane in the previous target frame image are superimposed to obtain an edge point set; and then, selecting edge points from an edge point dense area of the edge point set. Selecting the edge points from the edge point dense area can avoid interference of discrete points. For example, after the edge points are superimposed, there may be some edge points that deviate from a normal range, and exclusion of these edge points can improve a fitting effect.

In addition, a weight may be set for each frame image according to a distance between the camera and the target object, and then the target edge points are selected according to a magnitude of the weight. That is, more target edge points are selected from a frame image with a larger weight, and less target edge points are selected from a frame image with a smaller weight.

In an embodiment, steps of determining whether the object plane is the partial region plane of the object or whether the object plane is blocked by another object in the target frame image may specifically include: mapping, by the terminal, three-dimensional edge points into two-dimensional edge points; determining a convex polygon corresponding to the two-dimensional edge points, and calculating an area of the convex polygon; determining a bounding graph of the two-dimensional edge points, and calculating an area of the bounding graph; and determining that the object plane is the partial region plane of the object or blocked by another object in the target frame image if a ratio of the area of the convex polygon to the area of the bounding graph reaches a preset ratio.

The convex polygon means that if any one of edges of a polygon is extended infinitely in two directions to become a straight line, all other edges are beside the straight line. In addition, all interior angles of the polygon shall not be reflex angles, and a line segment between any two vertexes is located inside the polygon or on an edge of the polygon.

In an embodiment, steps of selecting the target edge points from the edge points that are extracted from the object plane in the previous target frame image and the edge points of the object plane in the target frame image may specifically include: determining, by the terminal, a first weight corresponding to the target frame image and a second weight corresponding to the previous target frame image, the first weight being unequal to the second weight; selecting, according to the first weight, a first target edge point from the edge points of the object planes in the target frame image, and selecting, according to the second weight, a second target edge point from the edge points that are extracted from the object plane in the previous target frame image; and using the first target edge point and the second target edge point as the target edge points.

Magnitudes of the first weight and the second weight are related to a distance between the camera and an object if the camera shoots an image. That is, if the camera shoots an object in the target environment, the longer the distance is, the smaller a corresponding weight is. Similarly, if the camera shoots the object in the target environment, the closer the distance is, the larger the corresponding weight is.

In an embodiment, the terminal determines a size of the fitting graph. If the size is less than a preset size, the target frame image collected from the target environment is re-obtained, and S204 is performed. If the size is greater than or equal to the preset size, S206 is performed.

For example, considering complexity of a real scenario, if a length and a width of an object plane corresponding to an object in the target environment are within a certain range, in the fitting progress, a size of the object plane may be selected to be checked, and the fitting is determined to be successful only when a threshold is met.

S206. Delete, in the fitting graph, edge points that do not appear on the object plane of the previous frame image.

The previous frame image is a frame image obtained before the target frame image by collecting from the target environment, for example, the previous frame image is a previous frame of image of the target frame image, or previous n frames of images collected before the target frame image, or a nth frame of image collected before the target frame image.

In an embodiment, S206 may specifically include: if an edge point in the fitting graph does not appear on the object plane in the previous frame image, or the edge point in the fitting graph does not appear in the planar contour corresponding to the object plane in the previous frame image, deleting the edge points that do not appear from the fitting graph.

If the camera is far away from the object, an incident angle between an optical center of the camera and the object is relatively large, and a plurality of objects are place in a staggered manner in the target environment, there may be an error in the fitting graph obtained by fitting. In this case, there is a need to delete the edge points that do not appear on the object plane in the previous frame image from the fitting graph.

Figure 4:
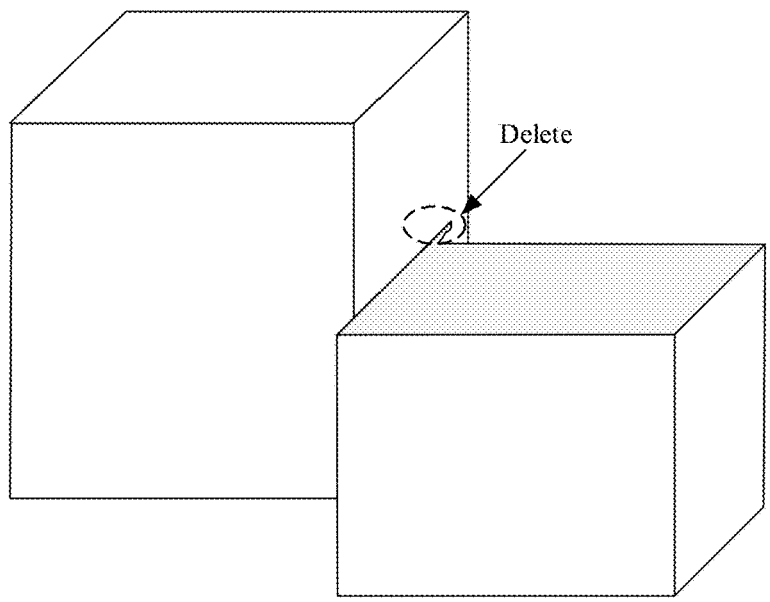
FIG. 4 is a schematic diagram of a planar contour obtained by fitting two cubic objects that are placed in a staggered manner according to an embodiment.

For example, as shown in FIG. 4, two objects in the figure are cubic objects. A fitting graph (for example, a gray region in the figure) of an upper surface of one of the two objects extends out along a side surface of the other object. A cause to this phenomenon is that there is a relatively large error in the depth information in this case, and therefore, planar fitting goes wrong. Therefore, for a fitting graph obtained by fitting edge points of object planes in a plurality of frames of images, edge points that do not appear on the object plane in the previous frame image are deleted from the fitting graph (that is, edge points in the dashed oval box in the figure are deleted), the edge points that do not appear on the object plane in the previous frame image being outliers. In this way, it can be avoided that a fitting error occurs in the fitting progress, thereby improving correctness of the fitting graph.

S208. Display, on the object plane of the target frame image, a planar contour constructed by remaining edge points in the fitting graph.

The planar contour may refer to a contour of a surface of an object, and the contour may be a rectangular contour, or a contour of another shape.

In an embodiment, the terminal may generate a planar graph bounding the remaining edge points in the fitting graph. The planar graph is the planar contour of the object.

Figure 5:
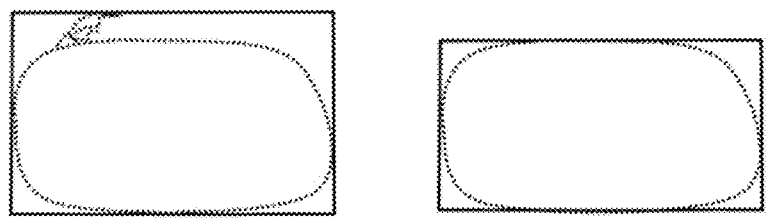
FIG. 5 is a schematic diagram of optimizing a fitting graph of two cubic objects that are placed in a staggered manner and fitting a planar contour according to the optimized fitting graph according to an embodiment.

For example, as shown in FIG. 5, a dashed line part on a left side of the figure is an original fitting graph, and a dashed line part on a right side of the figure is a new fitting graph obtained after the edge points that do not appear on the object plane in the previous frame image are deleted from the fitting graph, so as to construct the planar contour of the object according to the new fitting graph, thereby improving recognition accuracy of the planar contour of the object.

If the planar contour of the object is obtained, a size and a spatial position of the object can be determined based on the planar contour, and therefore, the terminal can perform a corresponding operation. The terminal can perform different operations for different application scenarios. The operations performed by the terminal are described in the following scenarios:

Scenario 1: An Application Scenario in which a Robot Moves.

In an embodiment, if the terminal is a robot, the robot determines a robot moving path in each planar contour constructed by using the target frame image, or selects a robot landing point in the planar contour; and then the robot moves according to the robot moving path or the robot landing point.

For a robot, in a movement process, there is a need to plan a moving path on a road ahead (which may include the staircase in FIG. 3). In addition, for a quadruped robot, in a movement process, there is a need to select a landing point on a road, to avoid missing a step or colliding with another object.

Scenario 2: An Application Scenario in which a Robot Clamps a Target Object.

In an embodiment, the foregoing object plane is region of a plane corresponding to the target object clamped by a robotic arm. If the terminal is the robotic arm, the robotic arm determines a size, an orientation, and a spatial position of the target object according to the planar contour, clamps the target object based on the size, orientation, and spatial position of the target object, and places the clamped target object at a designated position.

The size may refer to at least two of a length, a width, and a height of the target object. The orientation may refer to a direction towards which the target object faces, or may refer to a direction in which the target object is placed, for example, an express box is placed in a forward direction of the robotic arm.

In an embodiment, the steps of placing the clamped target object at the designated position may specifically include: collecting, by the terminal, an environment image at the designated position in a process of moving the robotic arm to place the target object; fitting edge points of each target object plane in the environment image and edge points of a corresponding target object plane in a previous frame environment image to obtain a target fitting graph; deleting, in the target fitting graph, edge points that do not appear on the target object plane of the previous frame environment image, the previous frame environment image being a frame image collected before the environment image; constructing a target planar contour by using remaining edge points in the target fitting graph; determining a placement posture of the target object according to the target planar contour; and placing the target object on the target object plane according to the placement posture.

The placement posture is a position at which the target object is placed and an orientation of the target object.

For example, if the designated position is an upper side of another object, that is, the target object is placed above the another object, a target planar contour corresponding to the another object can be recognized by using the foregoing method, and then a size and a spatial position of the another object are determined according to the target planar contour, and subsequently, the target object is placed on the another object according to the size and the spatial position of the another object, to ensure that the target object is free from collision during placing and is placed right above the target object.

Scenario 3: An Application Scenario of Augmented Reality.

In an embodiment, if the terminal is an AR device, after a planar contour of an object is obtained, a size and a spatial position of the planar contour are determined, and a virtual identifier about the size and the spatial position is generated. If the AR device displays a real picture about the target environment, the virtual identifier is displayed near the object in the real picture.

In the foregoing embodiments, the target frame image is collected from the target environment, and by fitting the edge points of each object plane in the target frame image and the edge points of the corresponding object plane in the previous frame image, the fitting graph of each object plane is obtained. If the edge points in the fitting graph do not appear in the object plane of the previous frame image, the edge points that do not appear are deleted as the outliers, to obtain the planar contour constructed by the remaining edge points, so that the planar contour of each object in the target frame image can be recognized without using deep learning, thereby reducing training time, and effectively improving efficiency of recognizing the planar contour of the target object. In addition, the edge points that do not appear are deleted as the outliers to obtain the planar contour of the object, so that a plurality of objects can be placed in a staggered manner, thereby affecting recognition of the planar contour, and improving the recognition accuracy of the planar contour.

Figure 6:
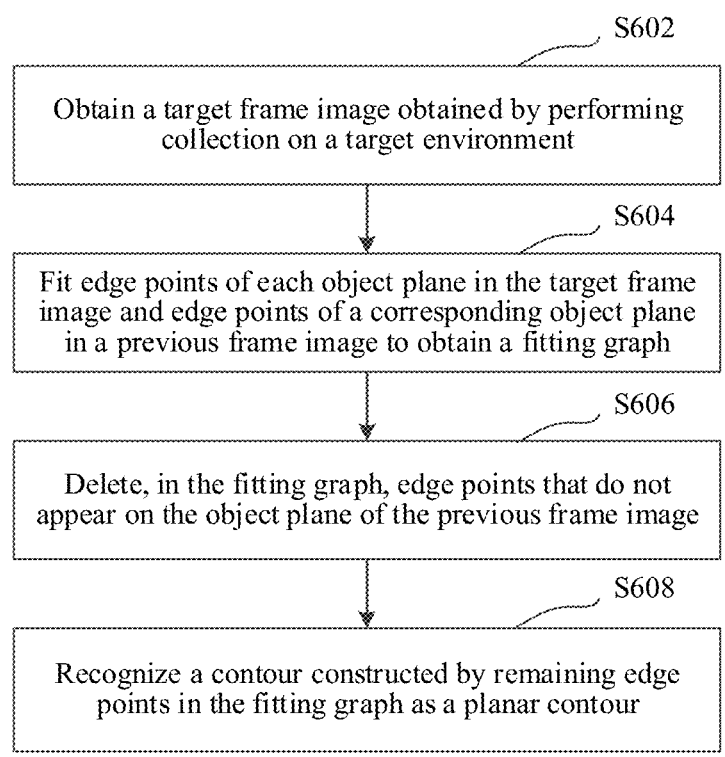
FIG. 6 is a schematic flowchart of a planar contour recognition method according to another embodiment.

In an embodiment, as shown in FIG. 6, a planar contour recognition method is provided, which may be performed by the terminal 102, or may be performed by the server 104, or may be performed by the terminal 102 and the server 104 in cooperation. Descriptions are made by using an example in which the method is performed by the terminal 102 in FIG. 1, and the method includes the following steps:

S602. Obtain a target frame image collected from a target environment.

The target environment may be a working environment of the terminal. The target environment is, for example, an environment in which a robot sorts items in the express delivery field, or a road environment in which the robot walks during working.

The target frame image may refer to an image obtained by the terminal by collecting an image or a video in the target environment through a built-in camera, or an image obtained by collecting an image or a video in the target environment through an independent camera. The target frame image may be a three-dimensional image carrying depth information, such as a depth image. In some embodiments, as shown in FIG. 3, the target frame image may be an image of a staircase in the target environment.

In an embodiment, if the built-in camera of the terminal collects from the target environment in real time to obtain a video, the video is decoded to obtain a target frame image. Alternatively, if the independent camera collects from the target environment in real time to obtain a video, the video is sent to the terminal in real time and decoded by the terminal to obtain a target frame image. The target frame image is a video frame in the video.

In another embodiment, the terminal uses the built-in camera to shoot the target environment at a preset time interval to obtain a target frame image, or uses the independent camera to shoot the target environment at the preset time interval to obtain a target frame image, and then the shot target frame image is transmitted to the terminal.

In an embodiment, the terminal may display the target frame image through a display screen after obtaining the target frame image.

S604. Fit edge points of each object plane in the target frame image and edge points of a corresponding object plane in a previous frame image to obtain a fitting graph.

The previous frame image is a frame image obtained before the target frame image by collecting from the target environment. The object plane may refer to a surface of an object displayed in the target frame image, that is, a surface of an unblocked object. In addition, the object plane may be a horizontal plane or a curved plane. In subsequent embodiments, descriptions are made by using an example in which the object plane is a horizontal object plane.

The object may refer to a target object that is in the target environment and shot in the target frame image. Surfaces of the object in various directions may be horizontal planes. In addition, the object may be in a specific geometric shape. For example, the object may be an express box for containing an express item, or a staircase, or the like.

The fitting graph may refer to a closed curve diagram obtained by fitting edge points by using a curve line, or a closed graph obtained by fitting edge points by using a straight line. As shown in FIG. 3, a dashed graph is a fitting graph obtained by fitting edge points of a plane of a step of the staircase. Since the target frame image is a three-dimensional image, corresponding edge points may be three-dimensional edge points.

If the target frame image is a three-dimensional image, the corresponding edge points may alternatively be voxels of the object plane in the target frame image, or three-dimensional edge points of the target object in the target environment (that is, a real scenario). If the target frame image is a two-dimensional image, corresponding edge points may alternatively be two-dimensional pixels, or two-dimensional edge points of the target object in the target environment.

In an embodiment, the terminal determines a spatial position corresponding to each point in the target frame image according to the depth information; determines a plane on which each point is located according to the spatial position and a plane equation to obtain the object plane; and fits the edge points of the object plane and the edge points of the object plane corresponding to the previous frame image to obtain the fitting graph.

The spatial position may be a spatial coordinate in a three-dimensional spatial coordinate system.

In an embodiment, the target frame image includes a graphic code carrying direction information. The steps of determining the spatial position corresponding to each point in the target frame image according to the depth information may specifically include: determining, by the terminal, a coordinate system reference direction according to the direction information carried by the graphic code; constructing a spatial coordinate system based on the coordinate system reference direction; and determining, in the spatial coordinate system, the spatial position corresponding to each point in the target frame image based on the depth information.

The graphic code may be a barcode or a two-dimensional code, such as an Apriltag for indicating a direction.

Figure 7:
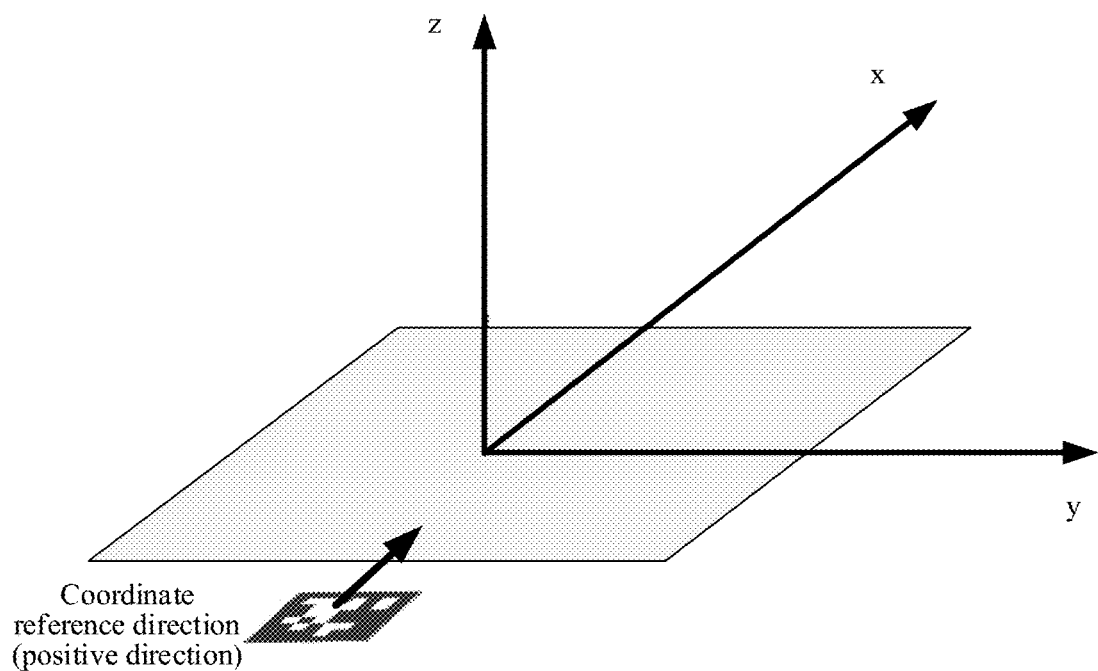
FIG. 7 is a schematic diagram of constructing a spatial coordinate system according to an embodiment.

For example, as shown in FIG. 7, a coordinate reference direction (which may also be referred to as a positive direction) of the spatial coordinate system may be determined by using the Apriltag, and the coordinate reference direction is used as an x-axis direction. Then, a normal direction of the object plane corresponding to the object is used as a z-axis direction, and a cross product direction of the x-axis direction and the z-axis direction is used as a y-axis direction. For example, if the x-axis direction is denoted as a vector a, the z-axis direction is denoted as a vector b, and a cross product direction of the vector and the vector b is denoted as a direction of a×b, the direction of a×b is that: four fingers point to a starting from b, and a direction pointed by a thumb is a direction of b×a. The direction is perpendicular to a plane on which b and a are located.

In an embodiment, the terminal may calculate, according to the depth information, a distance between each point of an object in the target frame image and the camera, and distances between points of the object. According to the distances, the spatial position of each point of the object in the target frame image in the spatial coordinate system may be determined.

In an embodiment, the steps of determining a plane on which each point on the surface of the object is located may specifically include: inputting, by the terminal, the spatial position (that is, the spatial coordinate) and the plane equation to a planar fitting model; and fitting, by using the planar fitting model, the spatial position of each point of the object according to the plane equation, to obtain the plane on which each point is located, thereby obtaining the object plane of the plane.

In an embodiment, the terminal fits the edge points of the object plane by using the straight line or the curve line to obtain the closed curve diagram or the closed graph formed by straight line segments. The closed curve diagram or the closed graph is determined as the fitting graph of the edge points of the object plane.

In an embodiment, the steps of fitting the edge points of the object plane and the edge points of the object plane corresponding to the previous frame image to obtain the fitting graph may specifically include: determining, by the terminal, a previous target frame image that includes the object plane in each of the previous frame images if the object plane is a partial region plane of the object or blocked by another object in the target frame image; extracting edge points from an object plane of the previous target frame image; selecting target edge points from the edge points that are extracted from the object plane in the previous target frame image and the edge points of the object plane in the target frame image; and fitting the selected target edge points to obtain the fitting graph.

The edge points are three-dimensional edge points. The previous frame image is a frame image obtained before the target frame image by collecting from the target environment, for example, the previous frame image is a previous frame of image of the target frame image, or previous n frames (that is, a previous frame of image to a previous nth frame of image) of images collected before the target frame image. Correspondingly, the previous target frame image refers to an image of the object plane including the object in the previous frame image.

A process of selecting the target edge points may include: first, superimposing the previous target frame image on the target frame image, so that the edge points of the object plane in the target frame image and the edge points of the corresponding object plane in the previous target frame image are superimposed to obtain an edge point set; and then, selecting edge points from an edge point dense area of the edge point set. Selecting the edge points from the edge point dense area can avoid interference of discrete points. For example, after the edge points are superimposed, there may be some edge points that deviate from a normal range, and exclusion of these edge points can improve a fitting effect.

In addition, a weight may be set for each frame image according to a distance between the camera and the target object, and then the target edge points are selected according to a magnitude of the weight. That is, more target edge points are selected from a frame image with a larger weight, and less target edge points are selected from a frame image with a smaller weight.

In an embodiment, steps of determining whether the object plane is the partial region plane of the object or whether the object plane is blocked by another object in the target frame image may specifically include: mapping, by the terminal, three-dimensional edge points into two-dimensional edge points; determining a convex polygon corresponding to the two-dimensional edge points, and calculating an area of the convex polygon; determining a bounding graph of the two-dimensional edge points, and calculating an area of the bounding graph; and determining that the object plane is the partial region plane of the object or blocked by another object in the target frame image if a ratio of the area of the convex polygon to the area of the bounding graph reaches a preset ratio.

The convex polygon means that if any one of edges of a polygon is extended infinitely in two directions to become a straight line, all other edges are beside the straight line. In addition, all interior angles of the polygon shall not be reflex angles, and a line segment between any two vertexes is located inside the polygon or on an edge of the polygon.

In an embodiment, steps of selecting the target edge points from the edge points that are extracted from the object plane in the previous target frame image and the edge points of the object plane in the target frame image may specifically include: determining, by the terminal, a first weight corresponding to the target frame image and a second weight corresponding to the previous target frame image, the first weight being unequal to the second weight; selecting, according to the first weight, a first target edge point from the edge points of the object planes in the target frame image, and selecting, according to the second weight, a second target edge point from the edge points that are extracted from the object plane in the previous target frame image; and using the first target edge point and the second target edge point as the target edge points.

Magnitudes of the first weight and the second weight are related to a distance between the camera and an object if the camera shoots an image. That is, if the camera shoots an object in the target environment, the longer the distance is, the smaller a corresponding weight is. Similarly, if the camera shoots the object in the target environment, the closer the distance is, the larger the corresponding weight is.

In an embodiment, the terminal determines a size of the fitting graph. If the size is less than a preset size, the target frame image collected from the target environment is re-obtained, and S604 is performed. If the size is greater than or equal to the preset size, S606 is performed.

For example, considering complexity of a real scenario, if a length and a width of an object plane corresponding to an object in the target environment are within a certain range, in the fitting progress, a size of the object plane may be selected to be checked, and the fitting is determined to be successful only if a threshold is met.

S606. Delete, in the fitting graph, edge points that do not appear on the object plane of the previous frame image.

The previous frame image is a frame image obtained before the target frame image by collecting from the target environment, for example, the previous frame image is a previous frame of image of the target frame image, or previous n frames of images collected before the target frame image, or a nth frame of image collected before the target frame image.

In an embodiment, S606 may specifically include: if an edge point in the fitting graph does not appear on the object plane in the previous frame image, or the edge point in the fitting graph does not appear in the planar contour corresponding to the object plane in the previous frame image, deleting the edge point that does not appear from the fitting graph.

If the camera is far away from the object, an incident angle between an optical center of the camera and the object is relatively large, and a plurality of objects are place in a staggered manner in the target environment, there may be an error in the fitting graph obtained by fitting. In this case, there is a need to delete the edge points that do not appear on the object plane in the previous frame image from the fitting graph.

For example, as shown in FIG. 4, two objects in the figure are cubic objects. A fitting graph (for example, a gray region in the figure) of an upper surface of one of the two objects extends out along a side surface of the other object. A cause to this phenomenon is that there is a relatively large error in the depth information in this case, and therefore, planar fitting goes wrong. Therefore, for a fitting graph obtained by fitting edge points of object planes in a plurality of frames of images, edge points that do not appear on the object plane in the previous frame image are deleted from the fitting graph (that is, edge points in the dashed oval box in the figure are deleted), the edge points that do not appear on the object plane in the previous frame image being outliers. In this way, it can be avoided that a fitting error occurs in the fitting progress, thereby improving correctness of the fitting graph.

S608. Recognize a contour constructed by remaining edge points in the fitting graph as a planar contour.

The planar contour may refer to a contour of the object plane of the target object, and the contour may be a rectangular contour, or a contour of another shape.

In an embodiment, the terminal may generate a planar graph bounding the remaining edge points in the fitting graph. The planar graph is the planar contour of the object.

For example, as shown in FIG. 5, a dashed line part on a left side of the figure is an original fitting graph, and a dashed line part on a right side of the figure is a new fitting graph obtained after the edge points that do not appear on the object plane in the previous frame image are deleted from the fitting graph, so as to construct the planar contour of the object according to the new fitting graph, thereby improving recognition accuracy of the planar contour of the object.

If the planar contour of the object is obtained, a size and a spatial position of the object can be determined based on the planar contour, and therefore, the terminal can perform a corresponding operation. The terminal can perform different operations for different application scenarios. The operations performed by the terminal are described in the following scenarios:

Scenario 1: An Application Scenario in which a Robot Moves.

In an embodiment, if the terminal is a robot, the robot determines a robot moving path in each planar contour constructed by using the target frame image, or selects a robot landing point in the planar contour; and then the robot moves according to the robot moving path or the robot landing point.

For a robot, in a movement process, there is a need to plan a moving path on a road ahead (which may include the staircase in FIG. 3). In addition, for a quadruped robot, in a movement process, there is a need to select a landing point on a road, to avoid missing a step or colliding with another object.

Scenario 2: An Application Scenario in which a Robot Clamps a Target Object.

In an embodiment, the foregoing object plane is a region of a plane corresponding to the target object. If the terminal is the robotic arm, the robotic arm determines a size, an orientation, and a spatial position of the target object according to the planar contour, clamps the target object based on the size, orientation, and spatial position of the target object, and places the clamped target object at a designated position.

The size may refer to at least two of a length, a width, and a height of the target object. The orientation may refer to a direction towards which the target object faces, or may refer to a direction in which the target object is placed, for example, an express box is placed in a forward direction of the robotic arm.

In an embodiment, the steps of placing the clamped target object at the designated position may specifically include: collecting, by the terminal, an environment image at the designated position in a process of moving the robotic arm to place the target object; fitting edge points of each target object plane in the environment image and edge points of a corresponding target object plane in a previous frame environment image to obtain a target fitting graph; deleting, in the target fitting graph, edge points that do not appear on the target object plane of the previous frame environment image, the previous frame environment image being a frame image collected before the environment image; constructing a target planar contour by using remaining edge points in the target fitting graph; determining a placement posture of the target object according to the target planar contour; and placing the target object on the target object plane according to the placement posture.

The placement posture is a position at which the target object is placed and an orientation of the target object.

For example, if the designated position is an upper side of another object, that is, the target object is placed above the another object, a target planar contour corresponding to the another object can be recognized by using the foregoing method, and then a size and a spatial position of the another object are determined according to the target planar contour, and subsequently, the target object is placed on the another object according to the size and the spatial position of the another object, to ensure that the target object is free from collision during placing and is placed right above the target object.

Scenario 3: An Application Scenario of Augmented Reality.

In an embodiment, if the terminal is an AR device, after a planar contour of an object is obtained, a size and a spatial position of the planar contour are determined, and a virtual identifier about the size and the spatial position is generated. If the AR device displays a real picture about the target environment, the virtual identifier is displayed near the object in the real picture.

In the foregoing embodiments, the target frame image is collected from the target environment, and by fitting the edge points of each object plane in the target frame image and the edge points of the corresponding object plane in the previous frame image, the fitting graph of each object plane is obtained. If the edge points in the fitting graph do not appear in the object plane of the previous frame image, the edge points that do not appear are deleted as the outliers, to obtain the planar contour constructed by the remaining edge points, thereby reducing the training time consumed by using the deep learning, and effectively improving the efficiency of recognizing the planar contour of the target object. In addition, the edge points that do not appear are deleted as the outliers to obtain the planar contour of the object, so that a plurality of objects can be placed in a staggered manner, thereby affecting recognition of the planar contour, and improving the recognition accuracy of the planar contour.

For example, descriptions are made by using an example in which the foregoing method is applied to a mobile robot or a mechanical arm. A video is collected by an RGB-D camera. For the video collected by the RGB-D camera, each video frame includes RGB color images or depth images (the depth image is the foregoing target frame image carrying the depth information) at different moments.

In this embodiment, a rectangular contour recognition method is mainly implemented based on the depth information. An example of rectangular contour recognition is shown in FIG. 3, and a surface of each step in the figure is rectangular. A rectangular plane obtained by performing time-domain fusion on the step in the depth image is represented by dashed lines, and a final rectangular contour is represented by black solid lines. A vertex of the rectangular contour is represented by a cross-shaped pattern, as shown in FIG. 3.

The rectangular plane obtained by performing the time-domain fusion refers to a rectangular plane obtained by fusing three-dimensional edge points of the step plane in the depth images at different moments in the spatial coordinate system at a certain moment, and then extracting target three-dimensional edge points from fused three-dimensional edge points, and subsequently, fitting the target edge points, that is, the fitting graph in the foregoing embodiments.

It should be noted that the rectangular plane in the target environment may be relatively large, and a visual field of a single frame image may not cover the entire rectangular plane. To cope with this situation, in this embodiment, on one hand, whether a fitted plane in the target environment is a target rectangular plane is recognized and screened in real time frame by frame; and on the other hand, in a process of recognizing the rectangular plane, three-dimensional edge points of the rectangular planes belonging to the same object in different frame images are fused, and a more accurate and complete rectangular region is optimized and extracted on this basis.

Spatial positions of all rectangular planes in the target environment can be determined if the rectangular contour in the target environment is recognized, so that corresponding operations can be performed. The operations are described according to the following different scenarios:

Scenario 1: A Sorting Scenario for Items

If the mechanical arm needs to clamp or move an object of a cubic type, by using the solution in this embodiment, visual information such as a size, an orientation, and a spatial position in a three-dimensional space of such an object may be provided, and the mechanical arm can accurately clamp the target object based on the visual information. In addition, the mechanical arm may further place the object at a designated position in the target environment, and controls a posture of the target object after the target object is placed, to avoid collision between the target object and another object in the target environment.

Scenario 2: A Scenario in which a Mobile Robot Moves

The mobile robot may be a quadruped robot. If there is a highly difficult scenario in which a step exists in a movement process of the quadruped robot, the method may provide a precise landing region for the quadruped robot in real time, to prevent the quadruped robot from missing a step, or prevent a foot of the quadruped robot from colliding with another object in the target environment in the movement process.

In addition, according to the landing region, it is convenient for the quadruped robot to choose a more reasonable landing point, or to plan a more reasonable moving path.

Through the solution of this embodiment, the following technical effects may be achieved.

Real-time performance: Whether the fitted rectangular plane is a real rectangular plane of the target object can be recognized and screened in real time frame by frame on a computer platform, and the rectangular contour is also recognized in real time.

Accuracy: The rectangular contour is recognized accurately.

Universality for scenarios: The rectangular contour recognition in this embodiment is universal, and may be applicable to most scenarios.

Robustness of an algorithm: A rectangular contour recognition algorithm in this embodiment is robust, with few failures.

For another example, it is found through experiments that a rectangular contour recognition process needs to face some core problems, which are specifically as follows: 1) The rectangular plane is not a centrosymmetric graph, and a positive direction of the rectangular plane needs to be obtained. 2) With limited computing resources, processing of three-dimensional (3D) data usually requires a series of complex operations, which is a challenge to real-time performance. 3) After planar fitting is completed for the entire scenario, various types of fitted planes are extracted, and the target rectangular plane needs to be screened out. 4) If a plane of a rectangular object in a scenario is relatively large, single rectangular contour recognition may merely obtain a part of a rectangular plane, and a more complete rectangular region needs to be obtained as much as possible. 5) For a complex scenario, if the RGB-D camera is far away from a target plane, and an incident angle between the optical center of the camera and the plane is relatively large, the error of the depth information becomes larger accordingly, and the recognized rectangular contour usually has an error and needs to be further optimized.

Figure 8:
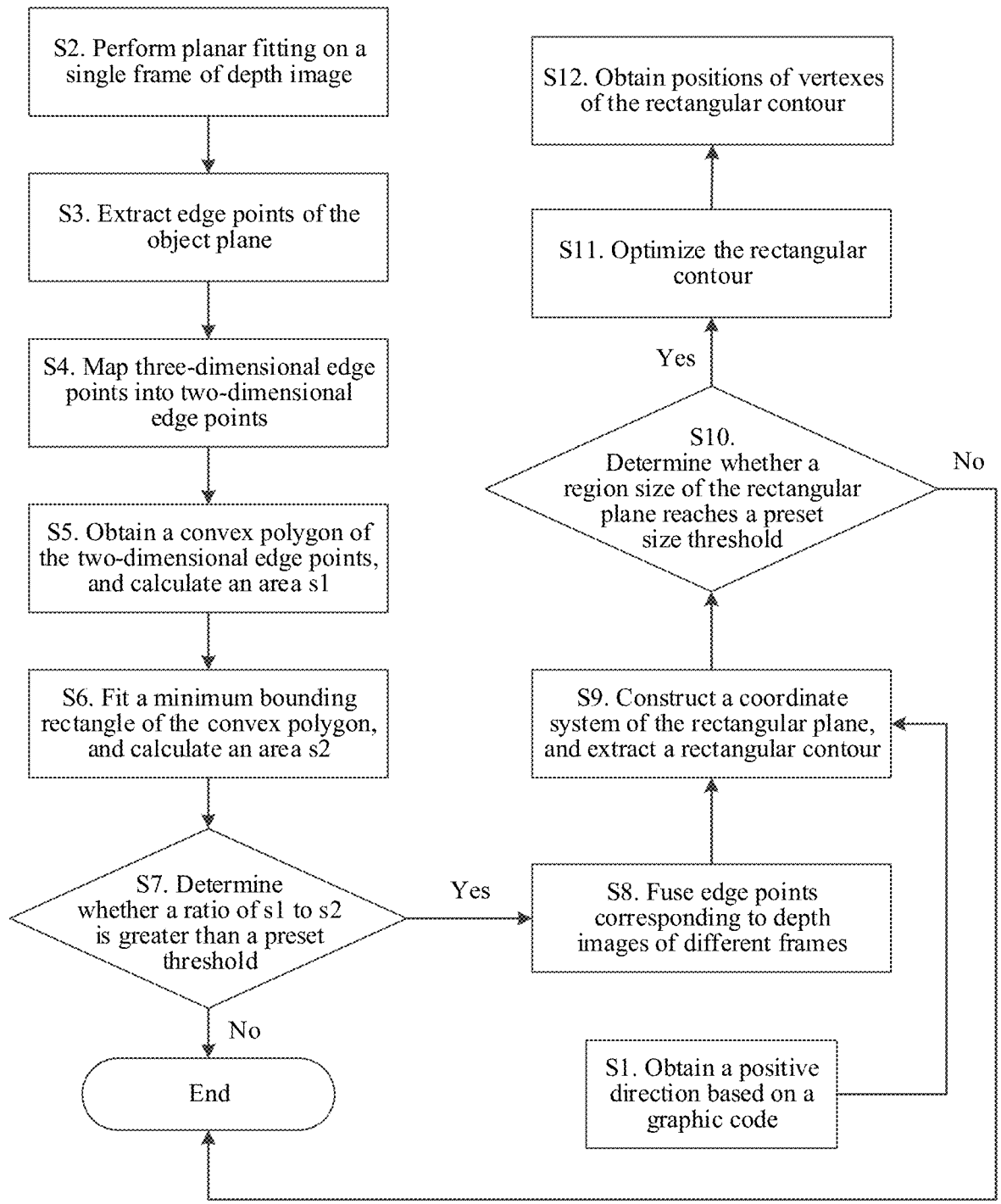
FIG. 8 is a schematic flowchart of a planar contour recognition method according to another embodiment.

To achieve a balance between the limited computing resources and precision of rectangular planar contour recognition, this embodiment provides a proper solution, and a flowchart thereof is shown in FIG. 8.

S1. Obtain a Positive Direction Based on a Graphic Code.

The graphic code may be an Apriltag, or another graph used for indicating a direction. An example in which the graphic code is the Apriltag is used. After the positive direction is obtained by using the Apriltag, a spatial coordinate system is constructed in the rectangular plane of the target object. As shown in FIG. 7, a normal line of the plane is used as a z-axis of the coordinate system, and the positive direction of the plane is used as an x-axis of the coordinate system. The positive direction of the plane is a direction parallel to any pair of sides of the rectangle.

In this embodiment, the positive direction is provided by using the Apriltag, that is, an Apriltag is placed before the target object, so that an orientation thereof is parallel to a pair of sides of the rectangular plane of the target object, which can help improve the universality and robustness for scenarios.

S2. Perform Planar Fitting on a Single Frame of Depth Image.

By using a planar fitting algorithm, a plurality of planes in the depth image are extracted as an input, and specific information is coordinates of all three-dimension points corresponding to each plane in a world coordinate system and a plane equation of the plane.

S3. Extract Three-Dimensional Edge Points of the Object Plane.

Considering that a single rectangular plane fitted in S2 includes a relatively large quantity of three-dimensional edge points, to save the computing resources, three-dimensional edge points corresponding to each rectangular plane are extracted through a current step. Subsequent operations are mainly performed based on these three-dimensional edge points, otherwise the entire algorithm is difficult to be real-time.

S4. Map the Three-Dimensional Edge Points into Two-Dimensional Edge Points.

Since the processing of the three-dimensional data is usually more complex than that of two-dimensional data, in this embodiment, for a module involving a complex operation, the three-dimensional edge points are mapped into the two-dimensional edge points, and a related operation is performed. Specific operations are as follows: First, the three-dimensional edge points of the object plane are mapped onto the object plane fitted in S2, and then a two-dimensional coordinate system is constructed on the object plane, to obtain two-dimensional coordinates corresponding to the three-dimensional edge points, that is, the two-dimensional edge points are obtained.

S5. Obtain a Convex Polygon Corresponding to the Two-Dimensional Edge Points, and Calculate an Area s1 of the Convex Polygon.

The convex polygon corresponding to the two-dimensional edge points of the object plane is used to represent the rectangular region of the target object, and then the area s1 corresponding to the convex polygon in a two-dimensional coordinate system is calculated. Since the edge points obtained in S3 and S4 are discrete, and the error of the depth information may cause the two-dimensional edge points to present irregular shapes (for example, jagged shapes), by using the convex polygon to represent the rectangular region of the target object, interference from the foregoing uncontrollable factors can be avoided.

S6. Fit a Minimum Bounding Rectangle of the Convex Polygon, and Calculate an Area s2 of the Bounding Rectangle.

Figure 9:
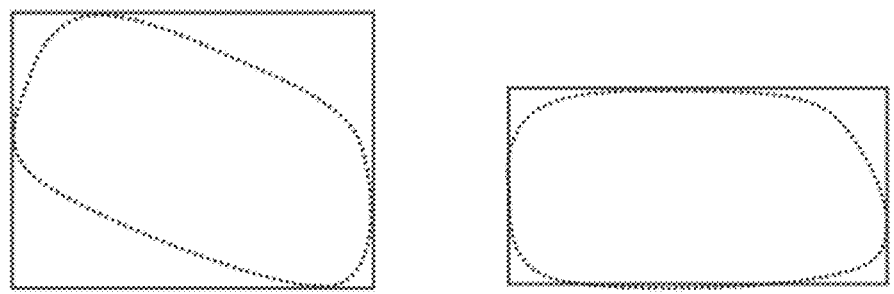
FIG. 9 is a schematic diagram of comparison between a rectangular contour fitted without using an Apriltag and a rectangular contour fitted by using the Apriltag according to an embodiment.

As shown in FIG. 9, a left figure represents a fitting result obtained by using a method in related art. If the positive direction of the object plane is unknown, the fitted bounding rectangle usually differs greatly from the real rectangular contour.

A right figure shows fitting of the minimum bounding rectangle that meets expectation. There are two fitting solutions. In one of the solutions, an orientation of the convex polygon is rotated to the positive direction first by using the positive direction of the rectangular plane obtained in S1, and then the bounding rectangle is fitted. In the other solution, the minimum bounding rectangle of the convex polygon is directly fitted by using a corresponding algorithm. By using the foregoing fitting solutions, problems that the depth information has the error, and the planes are blocked by each other can be resolved to a certain extent.

S7. Determine Whether a Ratio of s1 to s2 is Greater than a Preset Threshold.

The preset threshold may be set according to an actual situation. An example in which the preset threshold is equal to 0.9 is used for description herein. If the fitted object plane in S2 differs greatly from the rectangle, an overlapping area between a convex polygon of a certain plane corresponding to S5 and S6 and a minimum bounding rectangle is limited. Based on such a feature, the preset threshold is selected to be 0.9 for screening a non-rectangular plane.

Considering a case in which the object plane is blocked, on one hand, in a time domain process, a blocking situation is usually improved gradually in a process in which the object plane approach the camera from far to near; and on the other hand, in the time domain process, fusion of the rectangular planar contours may also relieve an impact from blocking to a certain extent. In addition, for a complex blocking situation, the foregoing preset threshold may be adjusted correspondingly.

S8. Fuse Three-Dimensional Edge Points Corresponding to Depth Images of Different Frames.

First, for the depth images of different frames, the time-domain fusion is performed on three-dimensional edge points of object planes of each frame. A fused object is a plurality sets of three-dimensional edge points corresponding to the same rectangular plane in the time domain process. Based on a result of SLAM, three-dimensional edge points at different moments are converted to be under a coordinate system at a certain moment, and then, three-dimensional edge points of these discrete points are re-extracted. An objective of extracting the three-dimensional edge points is to reduce an amount of data. In this step, the rectangular planes of the target object are continuously fused in the time domain process, to obtain a result that is approximate to a needed rectangular region.

Next, optimization is performed on parameters corresponding to a rectangular plane equation. For details, reference can be made to the following formula, where d represents a distance between a center point or a mean point of a 3D rectangular plane and the optical center of the camera, $w_i$ represents a weight of a parameter to be optimized corresponding to an ith frame, and $c_i$ represents a parameter to be optimized (for example, a normal) of the rectangular plane equation detected by the ith frame.

$$w_i = \frac{1}{d^2}$$

$$c = \frac{w_i c_i}{\sum w_i}$$

S9. Construct a Coordinate System of the Rectangular Plane, and Extract a Rectangular Contour.

Based on the result of S8, the regular rectangular contour is obtained, that is, four vertexes of the rectangular contour are obtained. The positive direction and the normal are respective provided in S1 and S2, and the spatial coordinate system of the rectangular plane is constructed based on the positive direction and the normal. As shown in FIG. 7, the normal is the z-axis, the positive direction is the x-axis, and y is obtained by a cross product of the x-axis and z-axis. In addition, an x-y plane coincides with the rectangular plane.

Then, three-dimensional points corresponding to the rectangular plane are projected onto the x-y plane, to obtain $x_{min}$, $x_{max}$, $y_{min}$, $y_{max}$ In this case, coordinates of the four vertexes of the rectangular contour are $(x_{min}, y_{max})$, $(x_{min}, y_{max})$, $(x_{max}, y_{min})$, and $(x_{max}, y_{max})$. A z value corresponding to each vertex may be obtained by using the plane equation.

S10. Determine Whether a Region Size of the Rectangular Plane Reaches a Preset Size Threshold.

Considering complexity of a real scenario, if a length and a width of the rectangular plane of the target object are within a certain range, a size of the rectangular plane may be selected to be checked, and only if the threshold is met, it is considered that the recognition is successful, thereby obtaining the rectangular contour corresponding to the rectangular plane.

S11. Optimize the Rectangular Contour.

This step is specific to a complex but common scenario, for example, a case in which the camera is far away from a certain rectangular plane, an incident angle between the optical center of the camera and the rectangular plane is relatively large, and a plurality of objects are placed in a staggered manner in the scenario. As shown in FIG. 4, two cubes are used as an example. In this case, the gray region is a planar fitting region, and it can be seen that a fitting object plane of the upper surface of the front cubic object extends out along the side surface of the rear cubic object, resulting in a planar fitting error. In this embodiment, by using the discrete points obtained by traversing the time-domain fusion in S8, discrete points that are within a visual field of the camera of a current frame but not within a range of the rectangular planar contour of the single frame image corresponding to S3 are filtered out, and these discrete points are outliers. As shown in FIG. 5, a left figure represents a rectangular planar contour recognition result showing that there are outliers in the discrete points obtained by the time-domain fusion in step 8, and a right figure represents a result after the optimization of the rectangular planar contour recognition.

S12. Obtain Three-Dimensional Coordinates of the Vertexes of the Rectangular Contour.

For the vertexes of the rectangular contour, reference may be made to four vertexes A to D in FIG. 3.

Through the solution of the foregoing embodiments, the following technical effects may be achieved.

Both the real-time performance and the accuracy can be achieved. Through a 3D mapping process and a 2D mapping process, a calculation complexity degree is greatly reduced. In addition, an amount of data to be calculated is also greatly reduced by extracting the planar contour, so that the rectangular planar contour in the video can be recognized in real time by using the algorithm.

On the other hand, in this application, by introducing the minimum bounding rectangle, the non-rectangular plane is filtered out, and scenarios in which the depth information has the error and the plane is blocked are processed more robustly.

For the rectangular region with a large area, by fusing and optimizing time-domain information, the final rectangular contour becomes more complete and accurate.

For the complex scenario, by optimizing the rectangular contour, an impact of erroneous fitting of the plane on the rectangular contour recognition is greatly alleviated, and a real-time, robust, and stable operation of the entire algorithm can be achieved.

It is to be understood that, although the steps in the flowcharts of FIG. 2, FIG. 6, and FIG. 8 are sequentially displayed according to indication of arrows, the steps are not necessarily sequentially performed in the sequence indicated by the arrows. Unless clearly specified in this specification, there is no strict sequence limitation on the execution of the steps, and the steps may be performed in another sequence. Moreover, at least some of the steps in FIG. 2, FIG. 6, and FIG. 8 may include a plurality of steps or a plurality of stages. These steps or stages are not necessarily performed at the same moment, but may be performed at different moments. These steps or stages are not necessarily executed sequentially, but may be performed in turn or alternately with another step or at least some of steps or stages of the another step.

Figure 10:
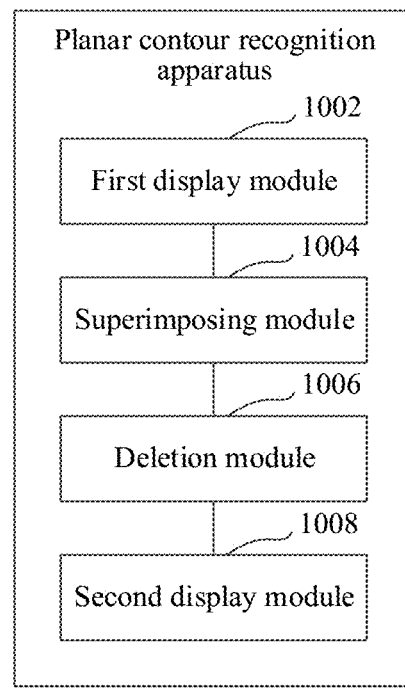
FIG. 10 is a structural block diagram of a planar contour recognition apparatus according to an embodiment.

In an embodiment, as shown in FIG. 10, a planar contour recognition apparatus is provided. The apparatus may become a part of a computer device by using a software module, or a hardware module, or a combination thereof. The apparatus specifically includes: a first display module 1002, a superimposing module 1004, a deletion module 1006, and a second display module 1008.

The first display module 1002 is configured to display a target frame image collected from a target environment;

The superimposing module 1004 is configured to superimpose a fitting graph obtained by fitting edge points of each object plane in the target frame image and edge points of a corresponding object plane in a previous frame image on the object plane for display, the previous frame image being collected from the target environment before the target frame image.

The deletion module 1006 is configured to delete, in the fitting graph, edge points that do not appear on the object plane of the previous frame image.

The second display module 1008 is configured to display, on the object plane of the target frame image, a planar contour constructed by remaining edge points in the fitting graph.

Figure 11:
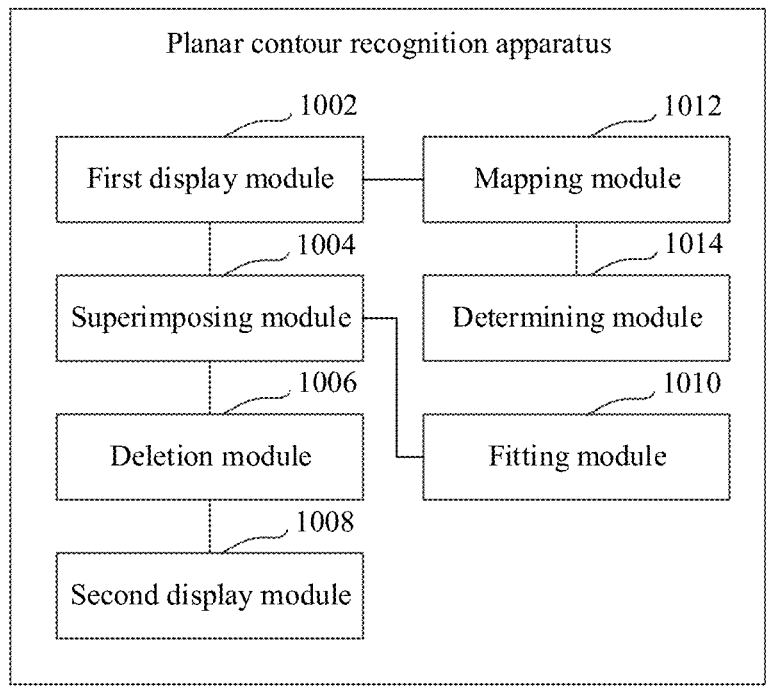
FIG. 11 is a structural block diagram of a planar contour recognition apparatus according to another embodiment.

In an embodiment, the target frame image includes depth information, and as shown in FIG. 11, the apparatus further includes a fitting module 1010.

The fitting module 1010 is configured to: determine a spatial position corresponding to each point in the target frame image according to the depth information; determine a plane on which each point is located according to the spatial position and a plane equation to obtain the object plane; and fit the edge points of the object plane and the edge points of the object plane corresponding to the previous frame image to obtain the fitting graph.

In an embodiment, the fitting module 1010 is further configured to: determine a previous target frame image that includes the object plane in each of the previous frame images if the object plane is a partial region plane of the object or blocked by another object in the target frame image; extract edge points from an object plane of the previous target frame image; select target edge points from the edge points that are extracted from the object plane in the previous target frame image and the edge points of the object plane in the target frame image; and fit the selected target edge points to obtain the fitting graph.

In an embodiment, the edge points are three-dimensional edge points, and as shown in FIG. 11, the apparatus further includes a mapping module 1012 and a determining module 1014.

The mapping module 1012 is configured to map the three-dimensional edge points into two-dimensional edge points.

The determining module 1014 is configured to: determine a convex polygon corresponding to the two-dimensional edge points, and calculate an area of the convex polygon; determine a bounding graph of the two-dimensional edge points, and calculate an area of the bounding graph; and determine that the object plane is the partial region plane of the object or blocked by another object in the target frame image if a ratio of the area of the convex polygon to the area of the bounding graph reaches a preset ratio.

In the foregoing embodiments, the target frame image is collected from the target environment, and by fitting the edge points of each object plane in the target frame image and the edge points of the corresponding object plane in the previous frame image, the fitting graph of each object plane is obtained. If the edge points in the fitting graph do not appear in the object plane of the previous frame image, the edge points that do not appear are deleted as the outliers, to obtain the planar contour constructed by the remaining edge points, so that the planar contour of each object in the target frame image can be recognized without using deep learning, thereby reducing training time, and effectively improving efficiency of recognizing the planar contour of the target object. In addition, the edge points that do not appear are deleted as the outliers to obtain the planar contour of the object, so that a plurality of objects can be placed in a staggered manner, thereby affecting recognition of the planar contour, and improving the recognition accuracy of the planar contour.

Figure 12:
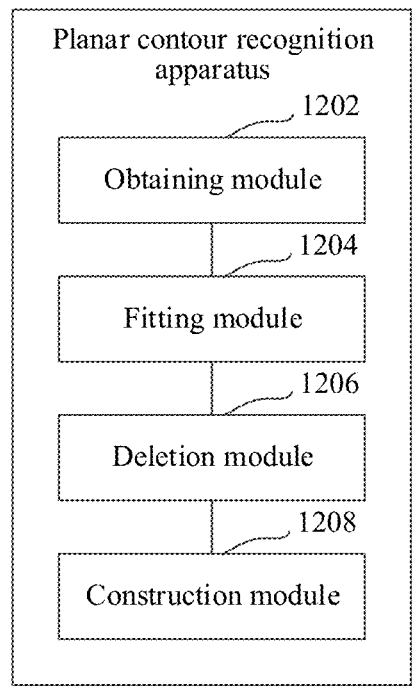
FIG. 12 is a structural block diagram of a planar contour recognition apparatus according to another embodiment.

In an embodiment, as shown in FIG. 12, a planar contour recognition apparatus is provided. The apparatus may become a part of a computer device by using a software module, or a hardware module, or a combination thereof. The apparatus specifically includes: an obtaining module 1202, a fitting module 1204, a deletion module 1206, and a construction module 1208.

The obtaining module 1202 is configured to obtain a target frame image collected from a target environment.

The fitting module 1204 is configured to fit edge points of each object plane in the target frame image and edge points of a corresponding object plane in a previous frame image to obtain a fitting graph, the previous frame image being collected from the target environment before the target frame image.

The deletion module 1206 is configured to delete, in the fitting graph, edge points that do not appear on the object plane of the previous frame image.

The construction module 1208 is configured to recognize a contour constructed by remaining edge points in the fitting graph as a planar contour.

Figure 13:
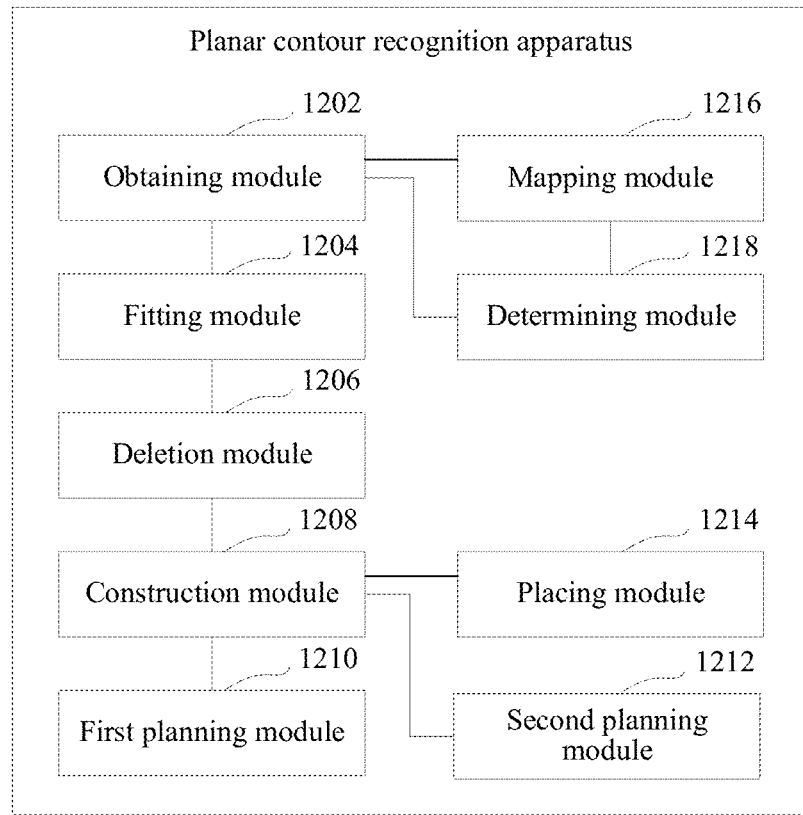
FIG. 13 is a structural block diagram of a planar contour recognition apparatus according to another embodiment.

In an embodiment, as shown in FIG. 13, the apparatus further includes a first planning module 1210.

The first planning module 1210 is configured to: determine a robot moving path in each planar contour constructed by using the target frame image, or select a robot landing point in the planar contour; and move according to the robot moving path or the robot landing point.

In an embodiment, the object plane is a region of a plane corresponding to a target object. As shown in FIG. 13, the apparatus further includes a second planning module 1212.

The second planning module 1212 is configured to: determine a size, an orientation, and a spatial position of the target object according to the planar contour; clamp the target object based on the size, orientation, and spatial position of the target object; and place the clamped target object at a designated position.

In an embodiment, as shown in FIG. 13, the apparatus further includes a placing module 1214.

The obtaining module 1202 is further configured to collect, in a process of moving a robotic arm to place the target object, an environment image at the designated position.

The fitting module 1204 is further configured to fit edge points of each target object plane in the environment image and edge points of a corresponding target object plane in a previous frame environment image to obtain a target fitting graph.

The deletion module 1206 is further configured to delete, in the target fitting graph, edge points that do not appear on the target object plane of the previous frame environment image, the previous frame environment image being a frame image collected before the environment image.

The construction module 1208 is further configured to construct a target planar contour by using remaining edge points in the target fitting graph.

The placing module 1214 is configured to determine a placement posture of the target object according to the target planar contour, and place the target object on the target object plane according to the placement posture.

In an embodiment, the target frame image includes the depth information. The fitting module 1204 is further configured to: determine a spatial position corresponding to each point in the target frame image according to the depth information; determine a plane on which each point is located according to the spatial position and a plane equation to obtain the object plane; and fit the edge points of the object plane and the edge points of the object plane corresponding to the previous frame image to obtain the fitting graph.

In an embodiment, the target frame image includes a graphic code carrying direction information. The fitting module 1204 is further configured to: determine a coordinate system reference direction according to the direction information carried by the graphic code; construct a spatial coordinate system based on the coordinate system reference direction; and determine, in the spatial coordinate system, the spatial position corresponding to each point in the target frame image based on the depth information.

In an embodiment, the fitting module 1204 is further configured to: determine a previous target frame image that includes the object plane in each of the previous frame images if the object plane is a partial region plane of the object or blocked by another object in the target frame image; extract edge points from an object plane of the previous target frame image; select target edge points from the edge points that are extracted from the object plane in the previous target frame image and the edge points of the object plane in the target frame image; and fit the selected target edge points to obtain the fitting graph.

In an embodiment, the edge points are three-dimensional edge points, and as shown in FIG. 13, the apparatus further includes a mapping module 1216 and a determining module 1218.

The mapping module 1216 is configured to map the three-dimensional edge points into two-dimensional edge points.

The determining module 1218 is configured to: determine a convex polygon corresponding to the two-dimensional edge points, and calculate an area of the convex polygon; determine a bounding graph of the two-dimensional edge points, and calculate an area of the bounding graph; and determine that the object plane is the partial region plane of the object or blocked by another object in the target frame image if a ratio of the area of the convex polygon to the area of the bounding graph reaches a preset ratio.

In an embodiment, the fitting module 1204 is further configured to: determine a first weight corresponding to the target frame image and a second weight corresponding to the previous target frame image, the first weight being unequal to the second weight; select, according to the first weight, a first target edge point from the edge points of the object planes in the target frame image, and select, according to the second weight, a second target edge point from the edge points that are extracted from the object plane in the previous target frame image; and use the first target edge point and the second target edge point as the target edge points.

In an embodiment, the determining module 1218 is further configured to determine a size of the fitting graph.

The obtaining module 1202 is further configured to re-obtain the target frame image collected from the target environment if the size is less than a preset size.

The deletion module 1206 is further configured to perform the step of deleting, in the fitting graph, edge points that do not appear on the object plane of the object in the previous frame image if the size is greater than or equal to the preset size.

In the foregoing embodiments, the target frame image is collected from the target environment, and by fitting the edge points of each object plane in the target frame image and the edge points of the corresponding object plane in the previous frame image, the fitting graph of each object plane is obtained. If the edge points in the fitting graph do not appear in the object plane of the previous frame image, the edge points that do not appear are deleted as the outliers, to obtain the planar contour constructed by the remaining edge points, thereby reducing the training time consumed by using the deep learning, and effectively improving the efficiency of recognizing the planar contour of the target object. In addition, the edge points that do not appear are deleted as the outliers to obtain the planar contour of the object, so that a plurality of objects can be placed in a staggered manner, thereby affecting recognition of the planar contour, and improving the recognition accuracy of the planar contour.

For a specific limitation on the planar contour recognition apparatus, refer to the limitation on the planar contour recognition method above. Details are not described herein again. The modules in the foregoing planar contour recognition apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server, and an internal structure diagram thereof may be shown in FIG. 14. The computer device includes a processor, a memory, and a network interface that are connected by using a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store image data. The network interface of the computer device is configured to communicate with an external terminal through a network connection. The computer program is executed by the processor to implement a planar contour recognition method.

In an embodiment, a computer device is provided. The computer device may be a terminal, and an internal structure diagram thereof may be shown in FIG. 15. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The communication interface of the computer device is configured to communicate with an external terminal in a wired or wireless manner. The wireless manner can be implemented through WIFI, an operator network, near field communication (NFC), or other technologies. The computer program is executed by the processor to implement a planar contour recognition method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 14:
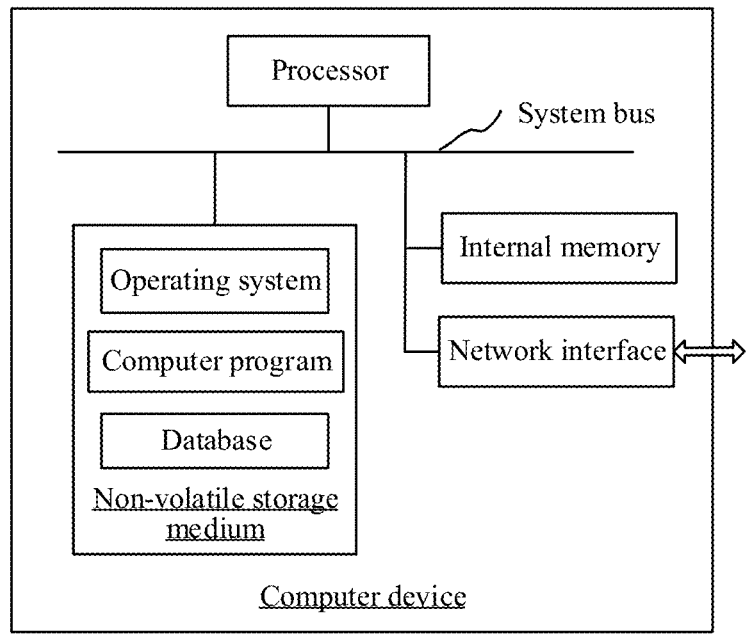
FIG. 14 is a diagram of an internal structure of a computer device according to an embodiment.
Figure 15:
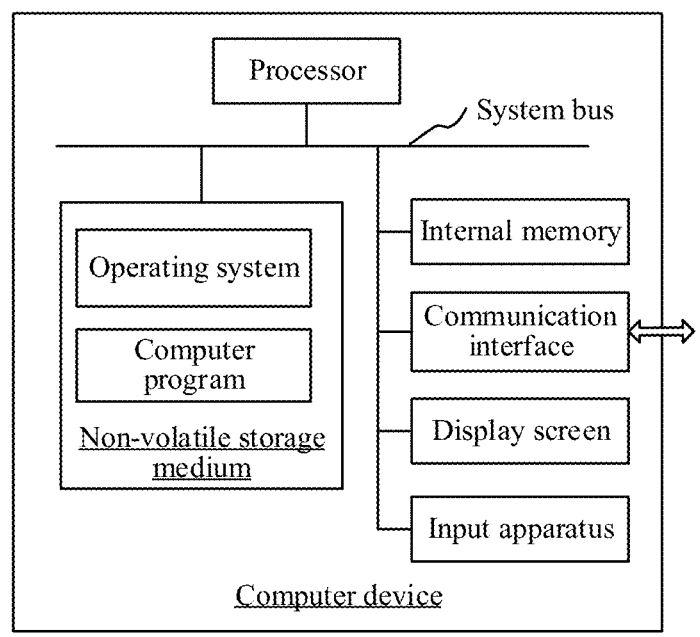
FIG. 15 is a diagram of an internal structure of a computer device according to another embodiment.

A person skilled in the art may understand that the structures shown in FIG. 14 and FIG. 15 are only block diagrams of a partial structure related to the solution of this application, and do not limit the computer device to which the solution of this application is applied. Specifically, the computer device may include more or fewer components than those shown in figures, or some components may be combined, or different component deployment may be used.

In an embodiment, a computer device is provided, including a memory and a processor, the memory storing a computer program, the computer program, when executed by the processor, causing the processor to perform the steps of the foregoing method embodiments.

In an embodiment, a computer readable storage medium is provided, storing a computer program, the computer program, when executed by a processor, performing the steps in the foregoing method embodiments.

In an embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

A person of ordinary skill in the art may understand that some or all procedures in the foregoing method embodiments may be implemented by a computer program instructing related hardware. The computer program may be stored in a non-volatile computer-readable storage medium, and in case that the computer program is executed, the procedures of the foregoing method embodiments may be performed. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be combined in different manners. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of this application, and their description is relatively specific and detailed, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of this application shall be subject to the protection scope of the appended claims.

What is claimed is:

1. A planar contour recognition method, performed by a computer device, the method comprising:
    obtaining a target frame image collected from a target environment, the target frame image comprising depth information;
    fitting edge points of an object plane in the target frame image and edge points of a corresponding object plane in a previous frame image to obtain a fitting graph, the previous frame image being collected from the target environment before the target frame image, the edge points being three-dimensional edge points;
    deleting edge points that do not appear on the object plane of the previous frame image in the fitting graph;
    recognizing a contour constructed by remaining edge points in the fitting graph as a planar contour; and
    controlling, based on the recognized planar contour, movement of a robot or placement of a target object,
    wherein the fitting the edge points of the object plane in the target frame image and the edge points of the corresponding object plane in the previous frame image to obtain the fitting graph comprises: determining a spatial position corresponding to each point in the target frame image according to the depth information; determining a plane on which each point is located based on the spatial position and a plane equation to obtain the object plane; and fitting the edge points of the object plane and the edge points of the object plane corresponding to the previous frame image to obtain the fitting graph, and
    wherein the method further comprises: mapping the three-dimensional edge points into two-dimensional edge points; determining a convex polygon corresponding to the two-dimensional edge points, and calculating an area of the convex polygon; determining a bounding graph of the two-dimensional edge points, and calculating an area of the bounding graph; and determining that the object plane is a partial region plane of an object or blocked by another object in the target frame image if a ratio of the area of the convex polygon to the area of the bounding graph reaches a ratio.

2. The method according to claim 1, the method further comprising:
    displaying the target frame image;
    displaying the edge points of the object plane in the target frame image and the edge points of the corresponding object plane in the previous frame image on the object plane when fitting the edge points; and
    displaying the planar contour constructed by the remaining edge points in the fitting graph on the object plane of the target frame image after recognizing the contour.

3. The method according to claim 2, wherein the fitting the edge points of the object plane and the edge points of the object plane corresponding to the previous frame image to obtain the fitting graph comprises:
    determining a previous target frame image that comprises the object plane in each of the previous frame images if the object plane is the partial region plane of the object or blocked by another object in the target frame image;
    extracting edge points from the object plane in the previous target frame image;
    selecting target edge points from the edge points that are extracted from the object plane in the previous target frame image and the edge points of the object plane in the target frame image; and
    fitting the selected target edge points to obtain the fitting graph.

4. The method according to claim 1, further comprising:
    determining a moving path in each planar contour constructed by using the target frame image, or selecting a landing point in the planar contour; and
    generating instructions instructing the robot to move according to the moving path or to land on the landing point.

5. The method according to claim 1, wherein the object plane is a region of a plane corresponding to the target object, and the method further comprises:
    determining a size, an orientation, and a spatial position of the target object according to the planar contour;
    clamping the target object based on the size, orientation, and spatial position of the target object; and
    placing the clamped target object at a designated position.

6. The method according to claim 5, wherein the placing the clamped target object at a designated position comprises:
    collecting, in a process of placing the target object, an environment image at the designated position;
    fitting edge points of each target object plane in the environment image and edge points of a corresponding target object plane in a previous frame environment image to obtain a target fitting graph;
    deleting edge points that do not appear on the target object plane of the previous frame environment image in the target fitting graph, the previous frame environment image being a frame image collected before the environment image;
    constructing a target planar contour by using remaining edge points in the target fitting graph;
    determining a placement posture of the target object according to the target planar contour; and
    placing the target object on the target object plane according to the placement posture.

7. The method according to claim 1, wherein the target frame image comprises a graphic code carrying direction information, and the determining the spatial position corresponding to each point in the target frame image according to the depth information comprises:
    determining a coordinate system reference direction according to the direction information carried by the graphic code;
    constructing a spatial coordinate system based on the coordinate system reference direction; and
    determining the spatial position corresponding to each point in the target frame image based on the depth information in the spatial coordinate system.

8. The method according to claim 1, wherein the fitting the edge points of the object plane and the edge points of the object plane corresponding to the previous frame image to obtain the fitting graph comprises:
    determining a previous target frame image that comprises the object plane in each of the previous frame images if the object plane is the partial region plane of the object or blocked by another object in the target frame image;
    extracting edge points from the object plane in the previous target frame image;
    selecting target edge points from the edge points that are extracted from the object plane in the previous target frame image and the edge points of the object plane in the target frame image; and
    fitting the selected target edge points to obtain the fitting graph.

9. The method according to claim 8, wherein the selecting target edge points from the edge points that are extracted from the object plane in the previous target frame image and the edge points of the object plane in the target frame image comprises:
- determining a first weight corresponding to the target frame image and a second weight corresponding to the previous target frame image, the first weight being different from the second weight;
- selecting, according to the first weight, a first target edge point from the edge points of the object planes in the target frame image, and selecting, according to the second weight, a second target edge point from the edge points that are extracted from the object plane in the previous target frame image; and
- using the first target edge point and the second target edge point as the target edge points.

10. The method according to claim 1, further comprising:
- determining a size of the fitting graph;
- re-obtaining the target frame image collected from the target environment if the size is less than a threshold value; and
- deleting edge points that do not appear on the object plane of the previous frame image if the size is greater than or equal to the threshold value in the fitting graph.

11. A non-transitory computer-readable storage medium, storing a computer program, the computer program, when executed by a processor, implementing operations of a contour recognizing method comprising:
- obtaining a target frame image collected from a target environment, the target frame image comprising depth information;
- fitting edge points of an object plane in the target frame image and edge points of a corresponding object plane in a previous frame image to obtain a fitting graph, the previous frame image being collected from the target environment before the target frame image, the edge points being three-dimensional edge points;
- deleting edge points that do not appear on the object plane of the previous frame image, in the fitting graph;
- recognizing a contour constructed by remaining edge points in the fitting graph as a planar contour; and
- controlling, based on the recognized planar contour, movement of a robot or placement of a target object,
- wherein the fitting the edge points of the object plane in the target frame image and the edge points of the corresponding object plane in the previous frame image to obtain the fitting graph comprises: determining a spatial position corresponding to each point in the target frame image according to the depth information; determining a plane on which each point is located based on the spatial position and a plane equation to obtain the object plane; and fitting the edge points of the object plane and the edge points of the object plane corresponding to the previous frame image to obtain the fitting graph, and
- wherein the contour recognizing method further comprises: mapping the three-dimensional edge points into two-dimensional edge points; determining a convex polygon corresponding to the two-dimensional edge points, and calculating an area of the convex polygon; determining a bounding graph of the two-dimensional edge points, and calculating an area of the bounding graph; and determining that the object plane is a partial region plane of an object or blocked by another object in the target frame image if a ratio of the area of the convex polygon to the area of the bounding graph reaches a ratio.

12. The computer-readable storage medium according to claim 11, the contour recognizing method further comprising:
- determining moving path in each planar contour constructed by using the target frame image, or selecting landing point in the planar contour; and
- moving according to the moving path or landing on the landing point.

13. The computer-readable storage medium according to claim 11, wherein, the object plane is a region of a plane corresponding to the target object, and the contour recognizing method further comprises:
- determining a size, an orientation, and a spatial position of the target object according to the planar contour;
- clamping the target object based on the size, orientation, and spatial position of the target object; and
- placing the clamped target object at a designated position.

14. The computer-readable storage medium according to claim 13, wherein the placing the clamped target object at a designated position comprises:
- collecting, in a process of placing the target object, an environment image at the designated position;
- fitting edge points of each target object plane in the environment image and edge points of a corresponding target object plane in a previous frame environment image to obtain a target fitting graph;
- deleting edge points that do not appear on the target object plane of the previous frame environment image in the target fitting graph, the previous frame environment image being a frame image collected before the environment image;
- constructing a target planar contour by using remaining edge points in the target fitting graph;
- determining a placement posture of the target object according to the target planar contour; and
- placing the target object on the target object plane according to the placement posture.

15. A computer device, comprising a memory and a processor, the memory storing a computer program, the processor, when executing the computer program, implementing operations of a contour recognizing method comprising:
- obtaining a target frame image collected from a target environment, the target frame image comprising depth information;
- fitting edge points of an object plane in the target frame image and edge points of a corresponding object plane in a previous frame image to obtain a fitting graph, the previous frame image being collected from the target environment before the target frame image, the edge points being three-dimensional edge points;
- deleting edge points that do not appear on the object plane of the previous frame image, in the fitting graph;
- recognizing a contour constructed by remaining edge points in the fitting graph as a planar contour; and
- controlling, based on the recognized planar contour, movement of a robot or placement of a target object,
- wherein the fitting the edge points of the object plane in the target frame image and the edge points of the corresponding object plane in the previous frame image to obtain the fitting graph comprises: determining a spatial position corresponding to each point in the target frame image according to the depth information; determining a plane on which each point is located based on the spatial position and a plane equation to obtain the object plane; and fitting the edge points of the object plane and the edge points of the object plane corresponding to the previous frame image to obtain the fitting graph, and wherein the contour recognizing method further comprises: mapping the three-dimensional edge points into two-dimensional edge points; determining a convex polygon corresponding to the two-dimensional edge points, and calculating an area of the convex polygon; determining a bounding graph of the two-dimensional edge points, and calculating an area of the bounding graph; and determining that the object plane is a partial region plane of an object or blocked by another object in the target frame image if a ratio of the area of the convex polygon to the area of the bounding graph reaches a ratio.

16. The computer-readable storage medium according to claim 11, wherein the target frame image comprises a graphic code carrying direction information, and the determining the spatial position corresponding to each point in the target frame image according to the depth information comprises:

determining a coordinate system reference direction according to the direction information carried by the graphic code;

constructing a spatial coordinate system based on the coordinate system reference direction; and determining the spatial position corresponding to each point in the target frame image based on the depth information in the spatial coordinate system.

17. The computer-readable storage medium according to claim 11, wherein the fitting the edge points of the object plane and the edge points of the object plane corresponding to the previous frame image to obtain the fitting graph comprises:

determining a previous target frame image that comprises the object plane in each of the previous frame images if the object plane is the partial region plane of the object or blocked by another object in the target frame image;

extracting edge points from the object plane in the previous target frame image;

selecting target edge points from the edge points that are extracted from the object plane in the previous target frame image and the edge points of the object plane in the target frame image; and fitting the selected target edge points to obtain the fitting graph.

18. The computer-readable storage medium according to claim 17, wherein the selecting target edge points from the edge points that are extracted from the object plane in the previous target frame image and the edge points of the object plane in the target frame image comprises:

determining a first weight corresponding to the target frame image and a second weight corresponding to the previous target frame image, the first weight being different from the second weight;

selecting, according to the first weight, a first target edge point from the edge points of the object planes in the target frame image, and selecting, according to the second weight, a second target edge point from the edge points that are extracted from the object plane in the previous target frame image; and using the first target edge point and the second target edge point as the target edge points.

19. The computer-readable storage medium according to claim 11, further comprising:

determining a size of the fitting graph;

re-obtaining the target frame image collected from the target environment if the size is less than a threshold value; and deleting edge points that do not appear on the object plane of the previous frame image if the size is greater than or equal to the threshold value in the fitting graph.

* * * * *